US008417624B2

(12) United States Patent
Bernard

(10) Patent No.: US 8,417,624 B2
(45) Date of Patent: Apr. 9, 2013

(54) SYSTEM AND PROCESS FOR PROTECTED RETIREMENT ASSET MANAGEMENT

(75) Inventor: Garth Bernard, New York, NY (US)

(73) Assignee: Metropolitan Life Insurance Co., Long Island City, NY (US)

( * ) Notice: Subject to any disclaimer, the term of this patent is extended or adjusted under 35 U.S.C. 154(b) by 406 days.

(21) Appl. No.: 11/803,493

(22) Filed: May 14, 2007

(65) Prior Publication Data

US 2008/0288383 A1     Nov. 20, 2008

(51) Int. Cl.
*G06Q 40/00*     (2012.01)
(52) U.S. Cl. ............................................. 705/38; 705/4
(58) Field of Classification Search .................... 705/10, 705/4, 35–38
See application file for complete search history.

(56) References Cited

U.S. PATENT DOCUMENTS

| 7,089,201 | B1 | 8/2006 | Dellinger | |
|---|---|---|---|---|
| 2002/0046154 | A1* | 4/2002 | Pritchard | 705/37 |
| 2003/0217008 | A1* | 11/2003 | Habegger et al. | 705/51 |
| 2005/0177509 | A1* | 8/2005 | Mahaney et al. | 705/40 |
| 2006/0106698 | A1* | 5/2006 | Mahaney et al. | 705/35 |
| 2007/0288301 | A1* | 12/2007 | Libman | 705/10 |
| 2008/0010095 | A1* | 1/2008 | Joyce | 705/4 |
| 2008/0189220 | A1* | 8/2008 | Herschler et al. | 705/36 R |

OTHER PUBLICATIONS

MassMutual, Responding to Baby Boomer, Retiree Needs for Retirement Income Solutions, MassMutual Unveils Retirement Management Account, May 22, 2006.*
Bonnie Bauman, Diversified Launches Lifetime Income Fund, Jun. 6, 2006.*
Bauman, Bonnie, "Russell to Launch Retirement Income Funds", Ignite.com, Aug. 29, 2006.
Bauman, Bonnie, "Diversified Launches Lifetime Income Fund", Ignite.com, Jun. 6, 2006.
MassMutual Financial Group, "Responding to Baby Boomer, Retiree needs for Retirement Income Solutions, MassMutual Unveils Retirement Management Account," May 22, 2006.
MassMutual Financial Group Product Brochure, "Introducing the MassMutual Retirement Management Account (RMA)".
"NY Life Produces VA with Longevity Provision," National Underwriter Online News Service, Dec. 20, 2006.
New York Life Product Brochure, "LifeStages Longevity Benefit Variable Annuity".
Prospectus of Phoenix Guaranteed Retirement Income Protector issued by PHL Variable Insurance Company.

* cited by examiner

*Primary Examiner* — Jason M Borlinghaus
*Assistant Examiner* — Hao Fu
(74) *Attorney, Agent, or Firm* — Troutman Sanders LLP

(57) ABSTRACT

In one aspect, the invention comprises a system for the management and administration of a longevity policy funded by a retirement account comprising: (a) a means for creating a customized longevity policy by predicting future economic performance based on client data and (b) a means of servicing the customized longevity policy. In another aspect, the invention comprises a method of funding and administering a longevity policy comprising: (a) creating a longevity policy; (b) transferring the asset fee from a retirement account to the longevity policy on a systematic basis; (c) providing statements regarding the longevity policy; (d) distributing benefit payments to the longevity policy holder on a systematic basis; (e) allowing the asset fee and starting age to be adjusted.

18 Claims, 5 Drawing Sheets

Longevity Income Protection Program

FIGURE 5
50th Percentile of Economic Scenarios Summary

| Age | Probability of Living | Investments | | Insurance |
|---|---|---|---|---|
| | | Account Balance | Systematic Withdrawal Program (SWP) Annual Income | LIG Annual Income at Age 85 |
| 55 | 100% | $1,000,000 | $0 | $8,017 |
| 60 | 97% | $1,578,285 | $0 | $43,653 |
| 65 | 94% | $2,265,002 | $110,523 | $78,680 |
| 70 | 88% | $1,690,628 | $128,126 | $101,582 |
| 75 | 79% | $1,017,695 | $148,533 | $112,669 |
| 80 | 66% | $442,962 | $172,191 | $115,927 |
| 85 | 50% | $0 | $0 | $115,935 |
| 90 | 31% | $0 | $0 | $115,935 |
| 95 | 15% | $0 | $0 | $115,935 |
| 100 | 6% | $0 | $0 | $115,935 |

SYSTEM AND PROCESS FOR PROTECTED RETIREMENT ASSET MANAGEMENT

FIELD OF INVENTION

The present invention generally relates to systems for administering a plurality of individual accounts directed to retirement account analysis and management. More particularly, the present invention relates to a data processing system designed to evaluate select inputs corresponding to client demographics, develop portfolio performance based on certain select inputs and manage the events and transactions related to the retirement account.

BACKGROUND OF THE INVENTION

Planning for retirement has become a crucial task for people of all ages. Unlike prior generations, today's adults must be proactive in ensuring that they will have adequate financial support for both themselves and their families up until death.

In previous generations, retirees were able to rely on Social Security, pension plans—also known as defined benefit plans—and personal savings to provide financial support throughout retirement. Under a defined benefit plan, the monthly retirement benefit paid out is usually a definite amount based on a calculation that takes into account the retiree's years of employment, wages earned while employed, and his/her age. There is financial security in that a retiree is usually able to know the monthly pay-out of his/her retirement plan well in advance. Furthermore, retirees are guaranteed their defined benefit payment for the duration of their life.

However, in more recent years, most employers have stopped offering a defined benefits plan and converted to a defined contribution plan. In fact, at present only 20% of Americans work for a company that offers a defined benefits plan. Under a defined contribution plan, each participant in the plan has an individual account and is responsible for contributing money to the plan. This money is then invested and the value of the account either increases or decreases depending on market performance. The ultimate retirement benefit payment made during retirement is unknown at the time of contribution and is based on the performance of the account investments.

Because the retirement benefit payment is based on the value of the account, retirees are often overly cautious with their accounts during the contribution, investment and distribution period. A retiree may refuse to invest aggressively for fear that a down market will deplete their accounts and their retirement savings will be gone. Alternatively, even when a retiree's account has benefited from the market and increased greatly in value, a retiree may prefer to take minimal retirement benefit payments for fear of outliving the total funds. Thus, the problem with the defined contribution system is that it is largely based on conjecture and hope-conjecture in that a retiree attempts to guess how long he/she will live, and hope in that the retiree hopes that the funds in his/her defined contribution account will last until death. Often, the fear that a person will "outlive" their retirement account causes an over-cautiousness in terms of investment and distribution.

Between the defined contribution plan and Social Security, adults planning for retirement do not have an adequate means of developing a stable, certain and potentially long-standing financial base with which to live during the duration of their life.

SUMMARY OF THE INVENTION

The present invention addresses the problems of the prior art by providing a retiree with the ability to seamlessly move from funds derived from a retirement asset portfolio or account to a source of funds from a longevity policy which has been funded by the retirement asset portfolio or account. The longevity policy referred to herein refers to a product, similar to a deferred annuity, in which a policy is purchased and benefit payments are made to the policy owner, beginning at a specified age such as 85, and extending for the duration of the policy owner's life.

The present invention assists in the integration and management of assets associated with a retirement account. As implemented by the inventive system, there are two parts of a retiree's plan: first, the retiree lives off the retirement benefit payments received from his/her defined contribution plan, then the retiree lives off of the benefit payments from a longevity policy. Because a retiree plans to use the funds from his/her defined contribution plan for only a finite amount of time, there is no fear that the funds will run out. As such, the funds can be invested at a more aggressive rate, potentially achieving a better result for the retiree. Additionally, through the use of compiled data, there is a capacity for the present invention to create models of economic performance, enabling the retiree to more knowledgably manage his/her retirement asset portfolio or account and accompanying longevity policy.

It is an object of the present invention to provide a data processing system that manages the servicing and administration of a plurality of longevity policies coupled to a plurality of retirement asset portfolios or accounts.

It is also an object of the present invention to provide systems for predicting future economic scenarios both with and without the protection afforded by the longevity policy in order to optimize the long-term returns.

It is another object of the present system to provide a system for coordinating a retirement asset portfolio or account and the longevity policy such that optimal funds are conveyed from one to the other.

It is a further object of the present system to provide a system for managing and servicing a pay-out phase of a longevity policy at an appropriate time.

The above and other objects of the present invention are realized in an illustrative computer based administrative system. The subject invention includes a database memory for storing a plurality of individual retirement accounts. A processor ran software that provides programming logic for account servicing and management, including the ability to create models of investments or make portfolio performance predictions. Individual retirement account information is routinely updated by the system manager depending on the retirement account owner's instructions. The system administers the retirement accounts as integrated with the longevity policy. The integration of the longevity policy with the selected retirement asset portfolio or account is first accomplished with the assistance of the present invention and then subsequently administered by the system of the present invention.

Implementation of the above attributes on a large scale can be accomplished with greater efficiency with a specifically structured data processing system that is configured to manage the multiple accounts in accordance with the characteristics of each account. The data processing system involves two discrete modules. The first compare account modeling and forecasting. This module presents future economic modeling to an account holder as a function of select inputs and assumptions regarding investments of the account. The second module supports account management and maintenance. This module receives inputs various events and tracks key dates, providing instructions based on these events and dates. The foregoing features are more fully appreciated taken in conjunction with the following description of a specific illustrative example.

In one aspect, the invention comprises a system for the management and administration of a longevity policy funded by a retirement account comprising: (a) a means for creating a customized longevity policy by evaluating client and demographic data and predicting future economic performance and (b) a means of servicing and maintaining the customized longevity policy including making sure that the funds are transferred at the appropriate time and that the benefit payments begin at the appropriate time.

In various embodiments: the client data can be pulled from a remote database or directly inputted; the balance and customized data of the longevity policy are maintained so that the user can be provided information on a systematic basis or upon request; and the presentation of future economic performance can be shown graphically or numerically.

In another aspect, the invention comprises a method of funding and administering a longevity policy comprising: (a) creating a longevity policy; (b) transferring the asset fee from a retirement account to the longevity policy on a systematic basis; (c) providing statements regarding the longevity policy; (d) distributing benefit payments to the longevity policy holder on a systematic basis; (e) allowing the asset fee and starting age to be adjusted.

In various embodiments: the longevity policy is established by a retirement account agent; the asset fee can be calculated as a percentage of the monthly account balance or the net account balance; and the statements can be provided on either a systematic basis or upon request.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5 illustrates another embodiment of the economic models and calculations that are visually displayed to the retiree.

DETAILED DESCRIPTION OF THE INVENTION

The system of the present invention is directed to administration and management of a longevity policy selectively integrated into a retirement account. Generally speaking, the first function of the present invention involves the determination of an investment strategy regarding the longevity policy appropriate for the account owner's retirement needs.

This may involve several alternatives for balancing risk with the desire for long term growth. For example, system default values based on select account demographics will produce a first model iteration for consideration. Alternatively, the system may attempt to optimize cash flow given select input parameters regarding the account. In one variation, the amount of the longevity policy is linked to account income for a pre-selected period.

Based upon client specific inputs and client demographics, different economic scenarios are predicted, both with and without the protection of a longevity policy, and shared with the client. Based on the economic predictions and the client's input, an asset fee, or systematic withdrawal, is established. The asset fee determined is a percentage of the total account balance of the retirement asset portfolio or account that is invested in the longevity policy. The asset fee to be invested in the longevity policy can be changed by the owner depending on future performance. The invention contemplates the asset fee being systematically withdrawn on a monthly basis or, alternatively, taken out as a lump sum. Thus, the percentage at which the asset fee is set can be based on the monthly balance or the net balance of the account.

After the investment strategy has been established, the system controls the day to day management of the longevity policy during the contribution/investment phase and the distribution phase, including, but not limited to, monitoring portfolio performance, predicting portfolio performance, creating models of investment with which to advise the retirement account owner, the calculation of any service fees or charges, determination and calculation of pay-outs, the management of the asset fee and the investment of such asset fee into the longevity policy. The types of tasks conducted by the system differ according to the directions of an individual owner.

The system also manages the conversion from the retirement account pay-out to the longevity policy pay-out. Once the conversion to the longevity policy is made, the system controls the day to day management of the longevity policy.

Figure 1:
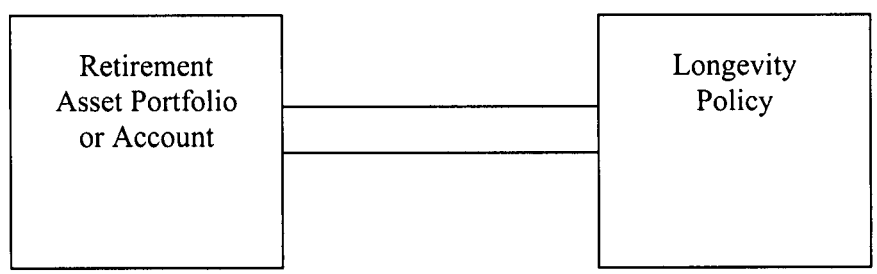
FIG. 1 illustrates the system's focus on the management of the link between the retirement asset portfolio or account and the coupled longevity policy.

With the foregoing overview in mind, the specific details of the present invention are further described. To provide a more complete understanding of the invention, FIG. 1 illustrates the distinct yet contiguous information that is processed and managed by the system. Specifically, FIG. 1 is a block diagram illustrating the system's focus on the management of the link between the retirement asset portfolio or account and the coupled longevity policy.

Figure 2:
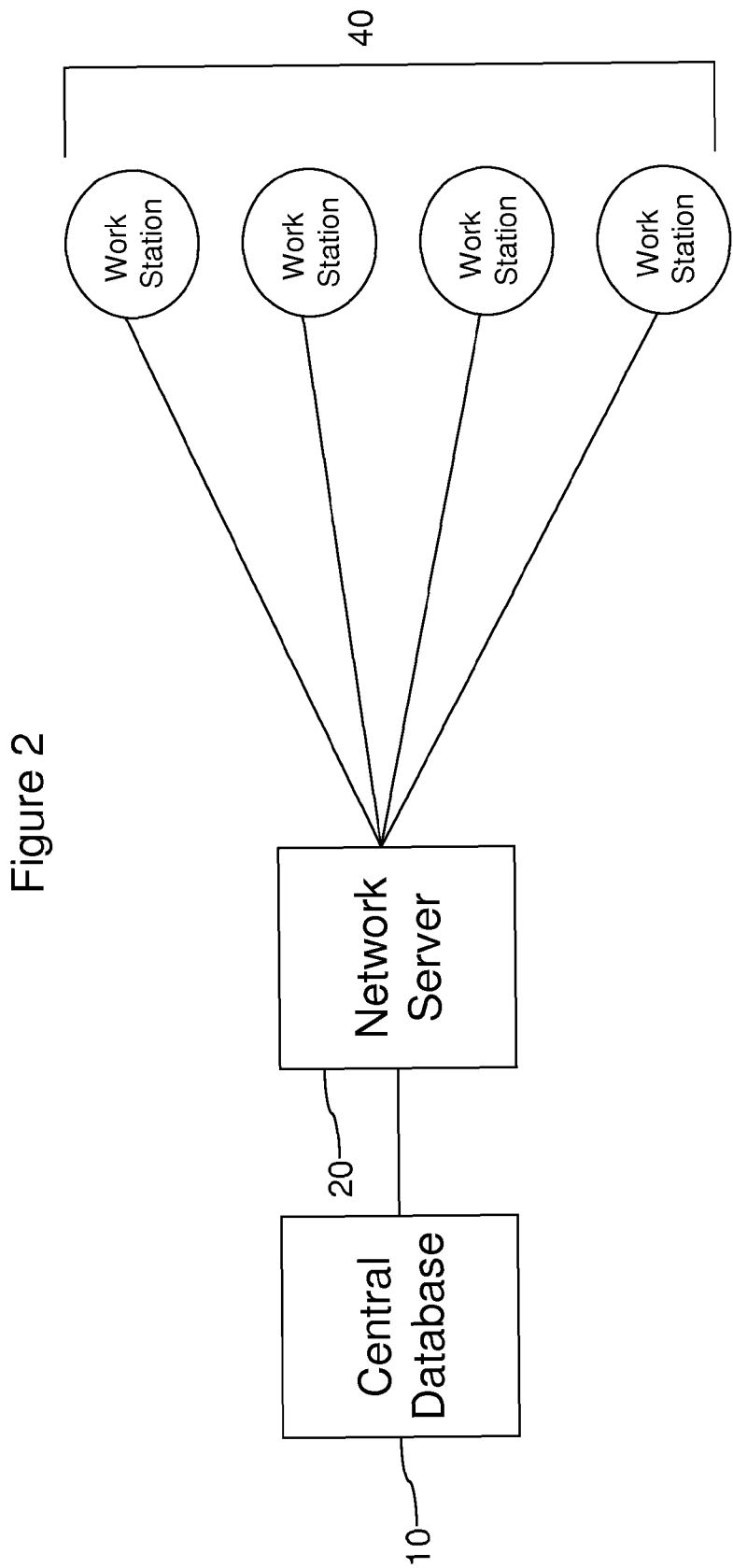
FIG. 2 illustrates the type of hardware and the associated interconnections there-between that may be used to implement the present invention.

FIG. 2 is a block diagram depicting the type of hardware and the associated interconnections there-between that may be used to implement the present invention. A central database 10 is linked to a Network Server 20. The Network Server provides separate links to one or more individual and discrete work stations (WS) 40. These work stations provide for multiple access ports to the database for economic scenario modeling with regards to the retirement asset portfolio or account and servicing and management of the coupled longevity policy.

Figure 3:
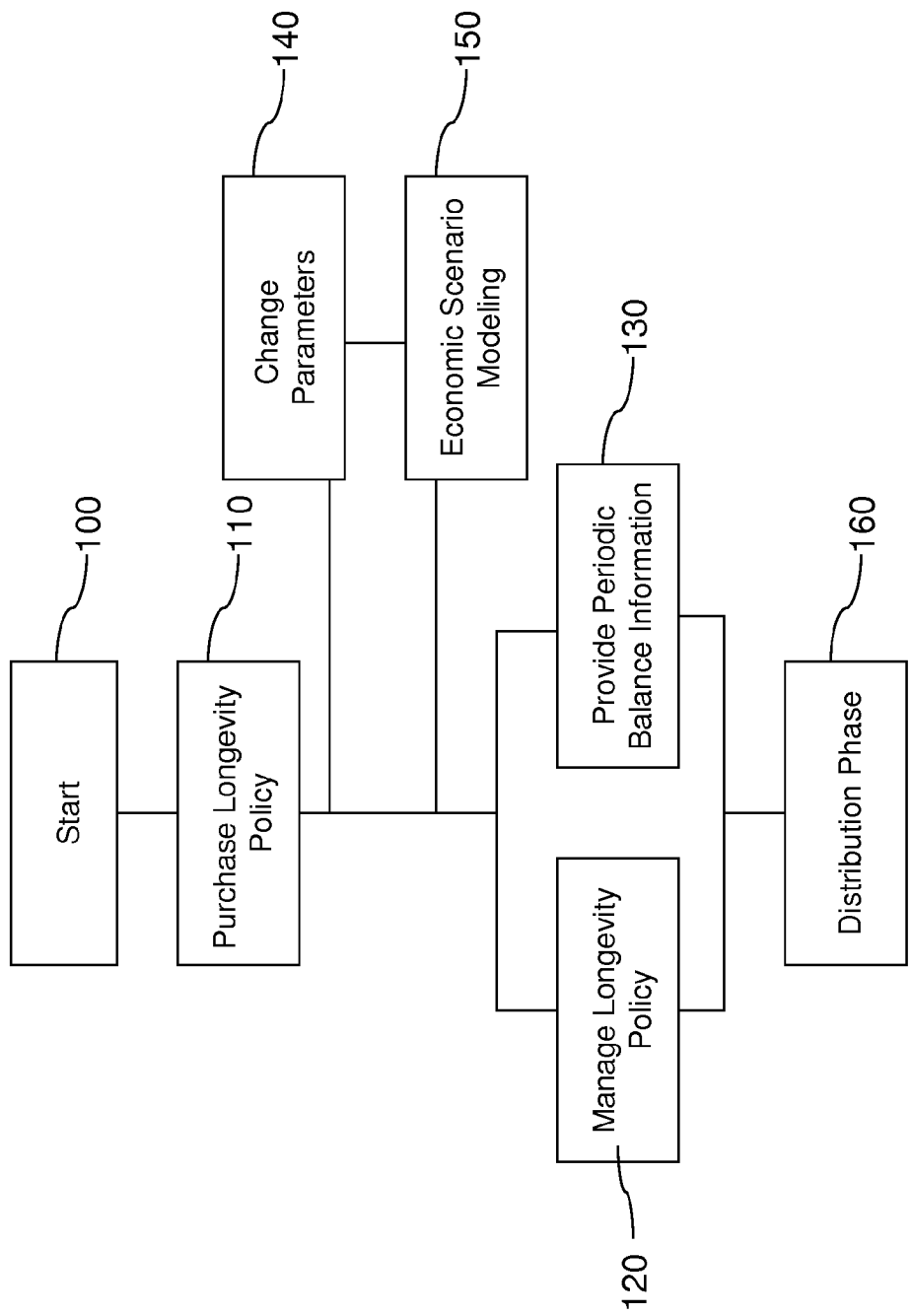
FIG. 3 illustrates one embodiment of the invention.

The flow chart in FIG. 3 depict a method embodiment of the invention. Beginning with start block 100, a user, usually sitting at a remotely located workstation, illustrates multiple economic scenarios that depict the retiree's future retirement income both with and without the protection of a longevity policy. These illustrations can take the form of values and graphs and are fully customizable, allowing the user to choose age, gender, starting portfolio value, asset allocation, asset fee withdrawal, etc.

In order to generate such illustrations, a representative, as demonstrated by the chart below, inputs various parameters including client name, gender, etc. Then a "funding starting age" is chosen. This age, typically the current age of the client, signals the time at which the asset fee is be taken from the retirement asset portfolio or account and invested in the longevity policy. Then a separate "withdrawal starting age" is chosen which signals the time at which time the systematic withdrawals are to be taken from the retirement asset portfolio or account. The "withdrawal starting age" may or may not be the same as the "funding starting age."

TABLE 1

| | |
|---|---|
| Withdrawal Starting Age | 65 |
| Percent or Dollar Amount | Percent |
| Withdrawal Rate | 5% |
| Dollar Amount | $0 |
| Withdrawal Increase Rate | 3% |
| Funding Starting Age | 55 |
| Funding Percent | 1.00% |
| Funding Amount Years | 30 |

Based on the data input by a representative and demographic data either directly inputted by a representative or uploaded from a remote database or file, various economic models are calculated based on standard algorithms and formulas, and visually displayed in order to demonstrate future economic predictions.

Figure 4:
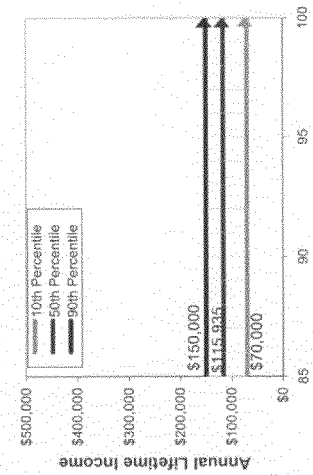
FIG. 4 illustrates one embodiment of the economic models and calculations that are visually displayed to the retiree.
Figure 4:
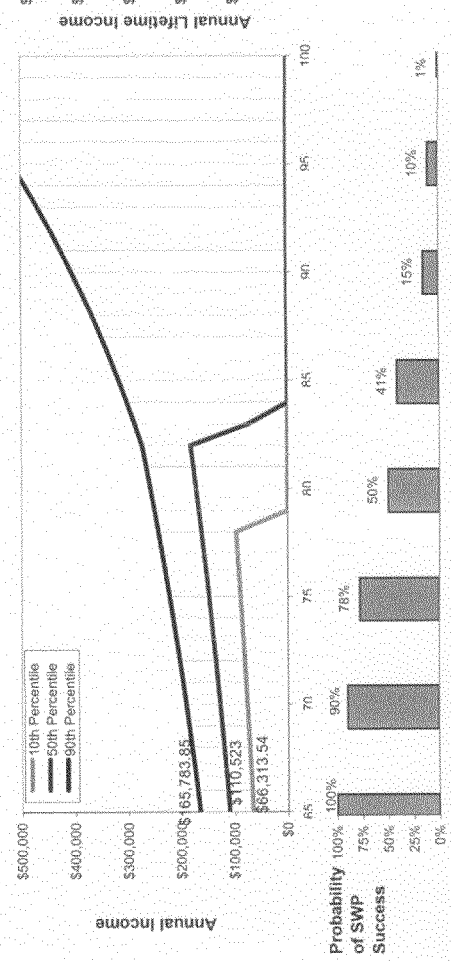

FIG. 4 depicts a format by which the collected information and the economic models are visually displayed to the retiree. Section 50 of FIG. 4 represents the data that is inputted by a representative. Section 60 of FIG. 4, shows the economic predictions, calculated from system formulas, based on the data entered in by the representative. FIG. 5 provides an alternative illustration of the output in a chart format.

After analyzing the different illustrations, a retiree or other user decides to purchase a longevity policy and chooses an asset fee, (see step 110 of FIG. 3). At this time the retiree also chooses a future date upon which the longevity policy will begin distributing pay-outs. There is no limit to the number of models that can be calculated and displayed to a retiree.

The system then manages the linked longevity policy by deducting the appropriate asset fee (step 120) and providing periodic balance information to the retiree or other user (step 130). The system also provides a means for a retiree or other user to change the asset fee or other parameters of the account based on the performance of either the asset based portfolio or account or the longevity policy (step 140). Any reconsideration of asset fee or other parameters may be accompanied by further economic scenario modeling based on the changed parameters (step 150). Any change in the asset fee or other parameters will be managed by the system immediately.

Finally, the system manages the beginning of the distribution phase of the longevity policy, administering the pay-outs and providing periodic updates on the account balance (step 160).

The above-described arrangement is merely illustrative of the principles of the present invention. Numerous modifications and adaptations thereof will be readily apparent to those skilled in the art without departing from the spirit and scope of the present invention.

What is claimed is:

1. A data processing system for the management and administration of a longevity policy, the data processing system comprising:
   a computer processor for initializing data representing a longevity policy based on data related to a client, wherein the longevity policy is an asset providing benefit payments made periodically to a policy beneficiary beginning at a specified age of the policy beneficiary and extending for the remainder of the policy beneficiary's life; and
   a servicing module for monitoring a plurality of longevity policies and providing for transactions associated with said longevity policies, including scheduling periodic funds transfers of a variable percentage of funds in a defined contribution plan account to the longevity policy, said transfers scheduled to occur at least in part before said beneficiary's retirement, wherein the servicing module is configured to automatically modify the variable percentage of funds in the periodic transfers based at least partially on a balance of the defined contribution plan account, and further wherein the amount to be transferred to the longevity policy is at least partly based on said balance of the defined contribution plan account;
   the computer processor being further configured to evaluate future economic performance of said longevity policy and said defined contribution plan account based at least partially on the data related to the client.

2. A system for the management and administration of a longevity policy, said system comprising:
   a network server, containing a processor, for collecting client information and client demographic data;
   a forecasting module, configured to be utilized by said processor, and configured to compute estimated future economic performance of a longevity policy based on the client information and the client demographic data, wherein the longevity policy is an asset providing benefit payments made periodically to a policy beneficiary beginning at a specified age of the policy beneficiary and extending for the remainder of the policy beneficiary's life; and
   a servicing module, configured to be utilized by said processor, and configured to monitor a longevity policy and provide for the periodic transfer of funds, at least in part before said beneficiary's retirement, from a defined contribution plan account to said longevity policy, wherein the servicing module is configured to automatically modify the percentage of funds to be transferred based at least partially on a balance of the defined contribution plan account, and further wherein the amount to be transferred to the longevity policy is at least partly based on said balance of the defined contribution plan account;
   the network server being in communication with the forecasting module and being further configured to present data describing multiple economic scenarios that depict the client's future retirement income both with and without the protection of a longevity policy; and
   the network server further being in communication with the servicing module and being further configured to present information about said longevity policy, said information including the current guaranteed minimum annual income to be received at said specified age.

3. The system of claim 2 wherein the forecasting module has access to said client information and demographic data through communication with a database associated with the network server.

4. The system of claim 2 wherein the forecasting module has access to said client information through direct input by a user.

5. The system of claim 2 wherein the client information includes the client's age, gender, a payment amount from the defined contribution plan account, a withdrawal starting age, a funding starting age, and a benefit payout age.

6. The system of claim 2 wherein the servicing module monitors a longevity policy's information.

7. The system of claim 6 wherein said longevity policy has an associated account balance, information regarding transfer of funds from the defined contribution plan account, and benefit payment information.

8. The system of claim 6 wherein the servicing module is in communication with the network server for presenting said longevity policy information to a user.

9. The system of claim 8 wherein said longevity policy information is presented to a user on a systematic basis.

10. The system of claim 8 wherein said longevity policy information is presented to a user upon request.

11. The system of claim 2 wherein said servicing module changes or updates longevity policy information as notified by the forecasting module.

12. The system of claim 2 wherein said servicing module changes or updates longevity policy information as notified by a user.

13. A computer implemented method of funding and administering a longevity policy, the method comprising:

establishing a longevity policy, said longevity policy being an asset providing benefit payments made periodically to a policy beneficiary beginning at a withdrawal starting age of the policy beneficiary and extending for the remainder of the policy beneficiary's life, and said longevity policy having an associated funding starting age at which customized payments from a defined contribution plan account begin to be invested in the longevity policy;

electronically transferring, by a computer and at least in part before said beneficiary's retirement, a variable percentage of funds from the defined contribution plan account to said longevity policy on a recurring systematic basis, said transfers scheduled to occur at least in part before said beneficiary's retirement, wherein the variable percentage is based at least partially on a balance of the defined contribution plan account, and further wherein the amount to be transferred to the longevity policy is at least partly based on said balance of the defined contribution plan account;

providing periodic balance reports on said longevity policy;

electronically distributing, by a computer, the benefit payments to the policy beneficiary on a systematic basis;

evaluating future economic performance of said longevity policy and said defined contribution plan account based at least partially on data related to a client; and allowing said customized payments and said starting age to be adjusted.

14. The method of claim 13 wherein the longevity policy is established by a retirement account agent.

15. The method of claim 13 wherein said customized payment is made periodically as a variable percentage of a monthly balance of the defined contribution plan account value, wherein the variable percentage updates monthly based on the monthly balance of the defined contribution plan account value.

16. The method of claim 13 wherein said customized payment is made periodically as a variable percentage of a net balance of the defined contribution plan account value, wherein the variable percentage updates monthly based on the net balance of the defined contribution plan account value.

17. The method of claim 13 wherein the balance reports are provided upon request.

18. The system of claim 2, wherein the amount of funds transferred between the defined contribution plan account and the longevity policy is based at least partially on a variable percentage of the balance of the defined contribution plan account.

* * * * *